US006792098B1

(12) United States Patent
Trump et al.

(10) Patent No.: US 6,792,098 B1
(45) Date of Patent: Sep. 14, 2004

(54) INTER-NETWORK LINE LEVEL ADJUSTMENT METHOD AND SYSTEM

(75) Inventors: Tönu Trump, Bandhagen (SE); Anders Roxström, Enskede (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 729 days.

(21) Appl. No.: 09/580,725

(22) Filed: May 30, 2000

(30) Foreign Application Priority Data

May 31, 1999 (SE) .............................................. 9901999

(51) Int. Cl.[7] .............................................. H04M 7/00
(52) U.S. Cl. .................. 379/221.07; 379/240; 379/347; 379/398
(58) Field of Search ............................... 379/29.01, 22, 379/4, 3, 221.07; 375/231

(56) References Cited

U.S. PATENT DOCUMENTS

| | | | | | |
|---|---|---|---|---|---|
| 4,367,456 | A | * | 1/1983 | Munter | 379/284 |
| 4,811,384 | A | | 3/1989 | Jensen | 379/89 |
| 5,016,271 | A | | 5/1991 | Ford | 379/410 |
| 5,052,023 | A | * | 9/1991 | Beichler et al. | 375/230 |
| 5,471,528 | A | * | 11/1995 | Reesor | 379/406.08 |
| 5,867,815 | A | | 2/1999 | Kondo et al. | 704/228 |
| 6,055,297 | A | * | 4/2000 | Terry | 379/22.08 |

FOREIGN PATENT DOCUMENTS

EP        0689332 A2   12/1995
GB        2242595 A    10/1991

OTHER PUBLICATIONS

Blomqvist, F., International–Type Search Report, Search Request NO. SE 99/00685, Mar. 1, 2000, pp. 1–4.
"Telephone Transmission Quality Objective Measuring Apparatus—Objective Measurement of Active Speech Level," ITU–T Recommendation p. 56, dated Mar. 1993.
"General Characteristics of International Telephone Connections and International Telephone Circuits—Automatic Level Control," ITU–T Recommendation G.ALC, Jan. 13–17, 1997.
Ericksson, A., et al, "Ericsson Echo Cancellers—A Key to Improved Speech Quality," Ericsson Review No. 1, 1996, pp. 25–33.

* cited by examiner

Primary Examiner—Minsun Oh Harvey
Assistant Examiner—Daniel Swerdlow

(57) ABSTRACT

An inter-network line level adjustment system includes a switch (SW1) and a processing unit (24) for identifying calls between a remote telephone network and a local telephone network. Echo cancellers (20) and/or speech coders (22) collect line level data associated with the identified calls. The processing unit (24) determines statistical properties of the collected line level data. Finally, the processing unit (24) instructs the echo cancellers (20) and/or speech coders (22) to adjust, based on the determined statistical properties, line levels of future calls between the remote telephone network and the local telephone network to a desired line level.

21 Claims, 3 Drawing Sheets

INTER-NETWORK LINE LEVEL ADJUSTMENT METHOD AND SYSTEM

TECHNICAL FIELD

The present invention relates to an inter-network line level adjustment method and system that compensate for different line levels in different telephone networks.

BACKGROUND

The telecommunication market gets more and more deregulated. This means that there usually are several active operators having their own telephone networks in a given geographical region. Sometimes a subscriber belonging to one operator wishes to call a subscriber belonging to another operator. In such a case different networks have to be interconnected. However, often networks belonging to different operators have different line (signal) levels. This results in a difference in perceived speech level for inter-network calls as compared to intranetwork calls. Furthermore, this difference in line level also gives performance problems in level sensitive equipment, such as echo cancellers and speech coders.

Reference [1] describes systems for manual line level measurement in a telephone network.

Reference [2] describes an automatic level control system based on line level measurements in a telephone network. This system dynamically adjusts the line level to a desired value. A drawback of such a system is that the line level has to be measured before an adjustment is possible. However, such a measurement will take some time. This implies that during the first few seconds of a call the line level may be either too high or too low before a measurement and a consequent adjustment have been made. This is especially annoying if a call from a rather quiet call is followed by a loud one, or vice versa. In this case the completely inappropriate line level of the previous call will be used as starting point for the new call. A similar problem occurs if a loud talker hands over the phone to a more quiet talker (or vice versa) during a call.

Furthermore, none of these systems distinguishes between intranetwork and inter-network calls. Therefore they are not capable of individually adjusting line levels for inter-network calls.

SUMMARY

An object of the present invention is an inter-network line level adjustment method and system that provide individual line level adjustment for inter-network calls.

This object is achieved in accordance with the attached claims.

Briefly, the present invention collects statistical data of line levels associated with calls between a remote and a local network. Based on these data the system adjusts the line level of future calls between the remote and the local network. This procedure has several advantages. For example, it is automatic, adjusts levels immediately at the start of a call, and may be implemented in already existing equipment, such as echo cancellers or speech coders.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
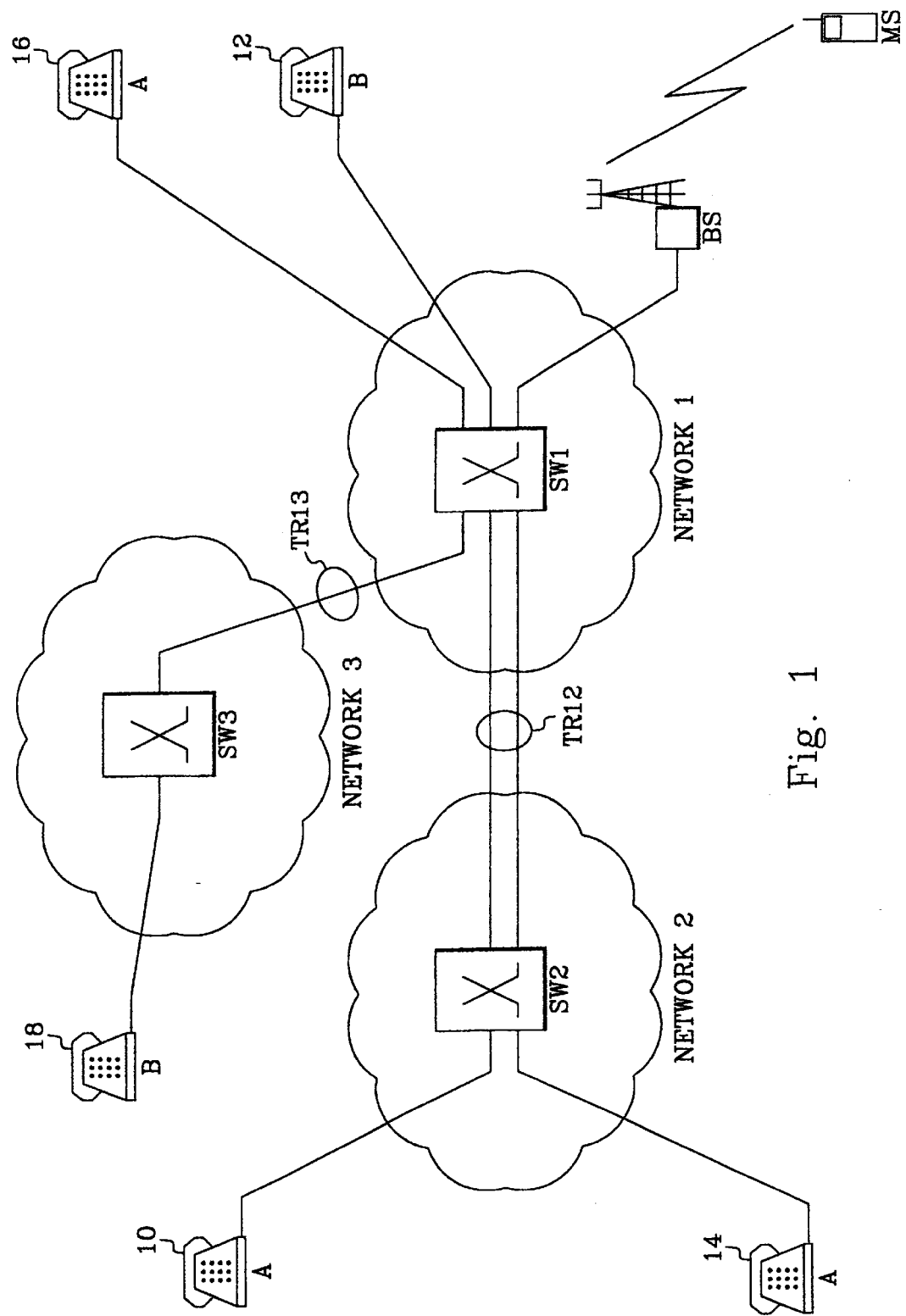
FIG. 1 is a block diagram illustrating interconnection of telephone networks.

FIG. 1 is a block diagram illustrating interconnection of telephone networks. A local telephone network, denoted network 1, is connected to remote telephone networks, denoted network 2 and network 3. The terms "remote" and "local" should not be interpreted literally; the networks may actually, and often do cover the same geographical region.

Typically each network has a different operator. Usually telephone calls originate and terminate in the same network, and each network establishes its own general line level. However, sometimes a remote subscriber 10 (A-subscriber) in network 2 calls a local subscriber 12 (B-subscriber) in network 1. In this case the call is directed from switch SW2 in network 2 to SW1 in network 1 on a trunk TR12. Since the line levels may be different in the two networks, such a connection may result in an annoying higher or lower speech level than normal at subscribers 10 and 12. Furthermore, line level sensitive equipment, such as echo cancellers, may also have performance problems due to unusually high or low signal amplitudes.

A similar problem occurs when a remote subscriber 14 (A-subscriber) calls a local cellular phone MS (B-subscriber). In this case performance problems may occur in the speech coder that is located in either base station BS or switch SW1.

The same problems also occur when a local subscriber calls (either on a regular or cellular phone) a remote subscriber, as illustrated by local subscriber 16 (A-subscriber) in network 1 calling remote subscriber 18 (B-subscriber) in network 3 over route SW1-TR13-SW3. The problems also occur between local and remote cellular phones.

Figure 2:
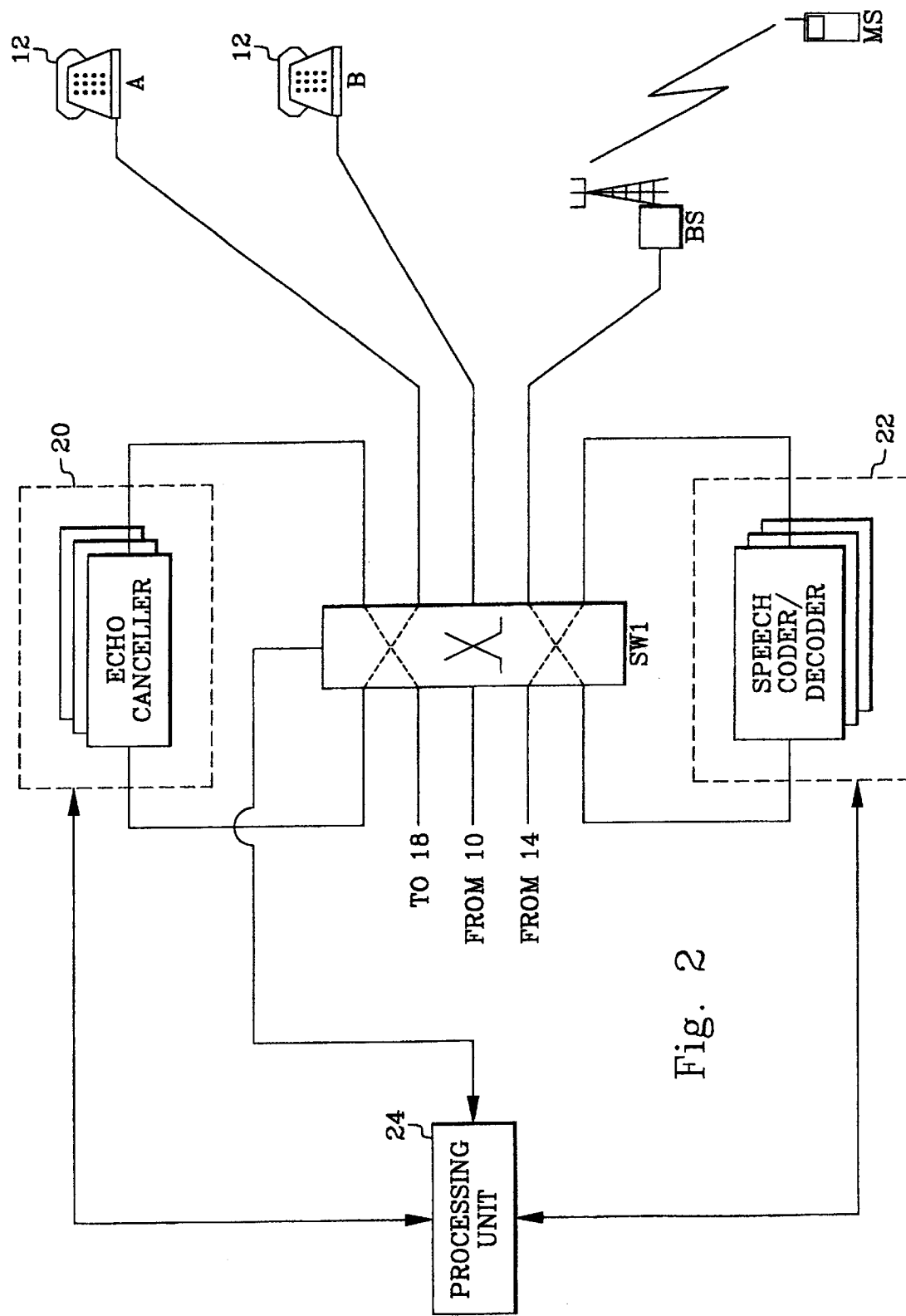
FIG. 2 is a block diagram illustrating some embodiments of the present invention.

FIG. 2 is a block diagram illustrating some embodiments of the present invention. This figure is an expanded version of the right part of FIG. 1, in which blocks essential to the present invention have been included.

The system in FIG. 2 includes a pool 20 of echo cancellers and a pool 22 of speech coders/decoders connected to switch SW1 of local network 1. When a call originating/terminating in a remote network and terminating/originating at a PSTN subscriber in the local network is established, this call is allocated one of the echo cancellers in pool 20. During the call the echo canceller measures the line level of the incoming signals from the remote network, for example by using the algorithms described in [1], and reports this line level to a processing unit 24. Processing unit 24 may comprise the control unit that controls switch SW1. Processing unit 24 also receives information from switch SW1 regarding the trunk that is associated with the measured line level and whether the call is terminating/originating in the local network. The trunk information identifies the calling/called remote network. The measured line level and associated trunk are recorded by processing unit 24 for each remote call. Such measurements are accumulated in a histogram, and an average line level L associated with the remote network is calculated in accordance with:

$$L = \frac{\sum_i h_i c_i}{\sum_i c_i}$$

where $c_i$ denotes the number of recorded calls to/from the remote network that have a measured line level in a line level interval around a center level $h_i$. Although not necessary, these intervals typically are of equal length. The length $h_{i+1}-h_i$ of an interval should be chosen in accordance with the line level adjustment step size to be used. A preferred length is 3 dB. The intervals should cover all possible line levels, i.e. from −68 dBm0 to 3 dBm0.

The calculated average line level L may be compared to a desired line level D (typically the general line level of the local network 1) to perform an appropriate adjustment.

To avoid degradation of speech quality of individual connections when line levels differ much from the average L, the level adjustment is preferably done taking into account the variability of the line levels on a given route. A measure of this variability may be expressed as:

$$V = \sqrt{\frac{\sum_i (h_i - L)^2 c_i}{\sum_i c_i}}$$

The resulting adjustment may be expressed as:

$$K = \begin{cases} \max(L, \min(L+\Delta, D_{MAX} - rV)), & \Delta > 0 \\ \min(L, \max(L+\Delta, D_{MIN} + rV)), & \Delta < 0 \end{cases}$$

where $\Delta = D-L$, and $D_{MAX}$, $D_{MIN}$ are the upper and lower limits for acceptable line level limits, respectively, for example $D_{MAX}=-6$ dBm0, $D_{MIN}=-27$ dBm0. A preferred value of the constant r is r=3.

At least 100 measurements ($\Sigma c_i = 100$) should be made to build up the histogram before any adjustments are done. Preferably more measurements, for example 1000, should be used.

Sliding average and variability computations are also possible, but the presently preferred method is to update the histogram with every measurement and to recompute L and V from time to time.

To cope with possible significant changes in the average level of a remote network, it is also possible to regularly start a new histogram, for example once a month. In this case the adjustment computed from the old histogram should be used until enough measurements have been collected to make the new histogram reliable.

The above principles are of primary interest in exchanges having echo cancellers, such as Mobile Services Switching Centres and international exchanges. Furthermore, only calls that originate or terminate in the local network are of interest. Transit calls are ignored. In this regard a call is usually associated with its remote network of origin or termination, since levels of pure transit calls are typically not changed by intermediate networks.

The calculated adjustment K is transferred from processing unit 24 to an echo canceller in pool 20 each time an echo canceller is allocated to a call that originates or terminates in the remote network that is associated with this adjustment value (each remote network is associated with its own adjustment). This may be done by "virtual trunks", which is a method of assigning route specific parameters to an echo canceller. It will set up the echo canceller to fit the route to which it will be connected. See [3] for more information on virtual trunks. The adjustment itself is typically performed by multiplying each incoming (to the local network) sample in the echo canceller by a scale factor.

The above discussion related to echo cancellers in pool 20. However, the same measurements and adjustments may also be performed in speech coders in pool 22. In fact they may be performed in any equipment having signal processing capabilities to perform the measurement algorithms and adjustment.

Figure 3:
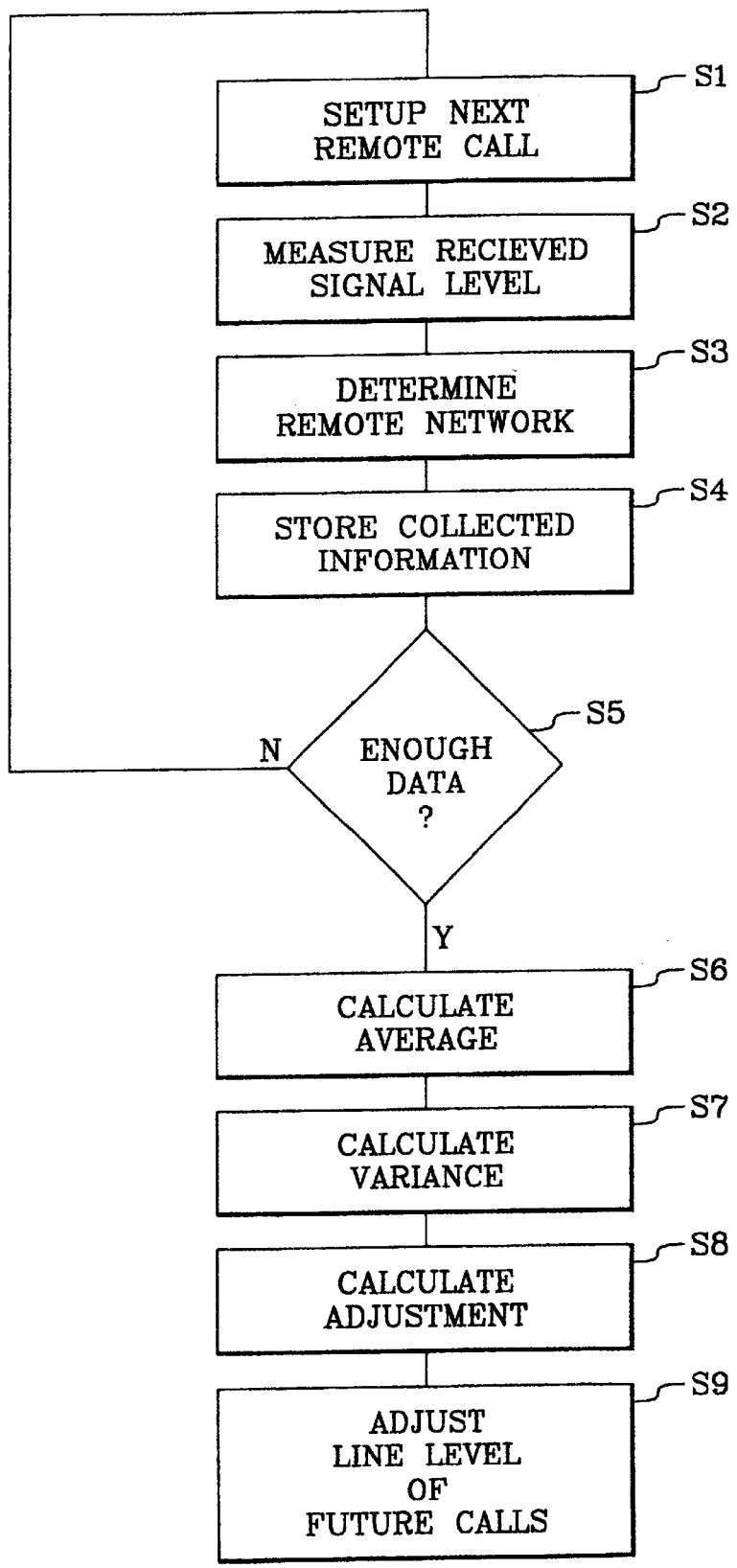
FIG. 3 is a flow chart illustrating an embodiment of the method of the present invention.

FIG. 3 is a flow chart illustrating an embodiment of the method of the present invention. In step S1 a call to or from a remote network is setup. Step S2 measures the received line level of this call. Step S3 determines the trunk on which the call was setup to identify the remote network. Step S4 records the information. Step S5 tests whether enough data for calculating an average has been collected. If not, the procedure returns to step S1 and repeats steps S1–S4 for the next call to or from the same remote network. If enough data has been collected, measures of the average and variance of the received line levels are calculated in steps S6 and S7. Step S8 calculates the adjustment from these parameters. Finally, step S9 uses the determined adjustment for adjusting the line level of future calls to and from this remote network. Steps S1–S8 may be repeated at a later time to determine a new adjustment. Similar procedures may be performed for each remote network.

In the above description it has been assumed that adjustments are made in signals directed to the local network. However, if desired adjustments in the opposite direction may also be performed on outgoing signals.

The present invention has several attractive features:
1. Both the measurements and adjustments are automatic.
2. The invention may be implemented in already existing equipment simply by reprogramming.
3. The method is robust against errors, since a large amount of measurements are averaged before actual adjustments are made.
4. The proposed method is capable of adjusting levels immediately at the start of a call, thereby avoiding abrupt level changes.

It will be understood by those skilled in the art that various modifications and changes may be made to the present invention without departure from the scope thereof, which is defined by the appended claims.

REFERENCES

[1] "Objective Measurement of Active Speech Level", ITU-T Recommendation P.56
[2] Ying Tao, "Automatic Level Control", G.ALC DRAFT 3, ITU-T Recommendation G.ALC
[3] A. Eriksson et. al., "Ericsson echo cancellers—a key to improved speech quality", Ericsson Review No. 1, 1996, pp. 25–33.

What is claimed is:

1. An inter-network line level adjustment method, comprising the steps of:
   identifying a plurality of call connections between a particular remote telephone network and a local telephone network;
   collecting line level data associated with said identified call connections;
   determining statistical properties of said collected line level data, said collected line level data associated with said call connections with said particular remote telephone network;

storing said determined statistical properties as being associated with said particular remote telephone network; and adjusting, based on said determined statistical properties, line levels of subsequent call connections between said particular remote telephone network and said local telephone network to a desired line level.

2. The method of claim 1, wherein said adjusting step includes adjusting attenuation of echo cancellers in said local telephone network.

3. The method of claim 1, wherein said collecting step includes measuring line levels in echo cancellers in said local telephone network.

4. The method of claim 1, wherein said adjusting step includes adjusting amplitude encoding/decoding of speech coders in said local telephone network.

5. The method of claim 1, wherein said collecting step includes measuring line levels in speech coders in said local telephone network.

6. The method of claim 1, wherein one statistical property is an estimate of average line level in said remote telephone network.

7. The method of claim 6, wherein one further statistical property is an estimate of line level variation in said remote telephone network.

8. The method of claim 1, wherein said adjusting step includes adjusting the line level of incoming signals to said local network.

9. The method of claim 1, wherein said adjusting step includes adjusting the line level of outgoing signals from said local network.

10. An inter-network line level adjustment system, comprising:

means for identifying a plurality of call connections between a particular remote telephone network and a local telephone network;

means for collecting line level data associated with said identified call connections;

means for determining statistical properties of said collected line level data, said collected line level data associated with said call connections with said particular remote telephone network;

means for storing said determined statistical properties as being associated with said particular remote telephone network; and means or adjusting, based on said determined statistical properties, line levels of subsequent call connections between said particular remote telephone network and said local telephone network to a desired line level.

11. The system of claim 10, wherein said adjusting means includes echo cancellers in said local telephone network.

12. The system of claim 10, wherein said collecting means includes echo cancellers measuring line levels in said local telephone network.

13. The system of claim 10, wherein said adjusting means includes speech coders in said local telephone network.

14. The system of claim 10, wherein said collecting means includes speech coders measuring line levels in said local telephone network.

15. The system of claim 10, wherein said identifying means includes a switch and a processing unit.

16. The system of claim 10, wherein said determining means includes a processing unit.

17. The system of 10, including means for adjusting the line level of incoming signals to said local network.

18. The system of claim 10, including means for adjusting the line level of outgoing signals from said local network.

19. A processor unit in an inter-network line level adjustment system, said processor unit comprising:

means for receiving data identifying a plurality of call connections between a particular remote telephone network and a local telephone network;

means for receiving line level data associated with said identified call connections;

means for determining statistical properties of said received line level data, said received line level data being associated with said call connections with said particular remote telephone network;

means for storing said determined statistical properties as being associated with said particular remote telephone network; and means for sending instructions, based on said determined statistical properties, defining line levels of subsequent call connections between said particular remote telephone network and said local telephone network to a desired line level.

20. The processor unit of claim 19, wherein said one statistical property is an estimate of average line levels in said remote telephone network.

21. The processor unit of claim 19, wherein said one statistical property is an estimate of line level variation in said remote telephone network.

\* \* \* \* \*